E. A. ESTES.
PLANTER ATTACHMENT.
APPLICATION FILED MAR. 16, 1918.
1,287,271.
Patented Dec. 10, 1918.
2 SHEETS—SHEET 1.
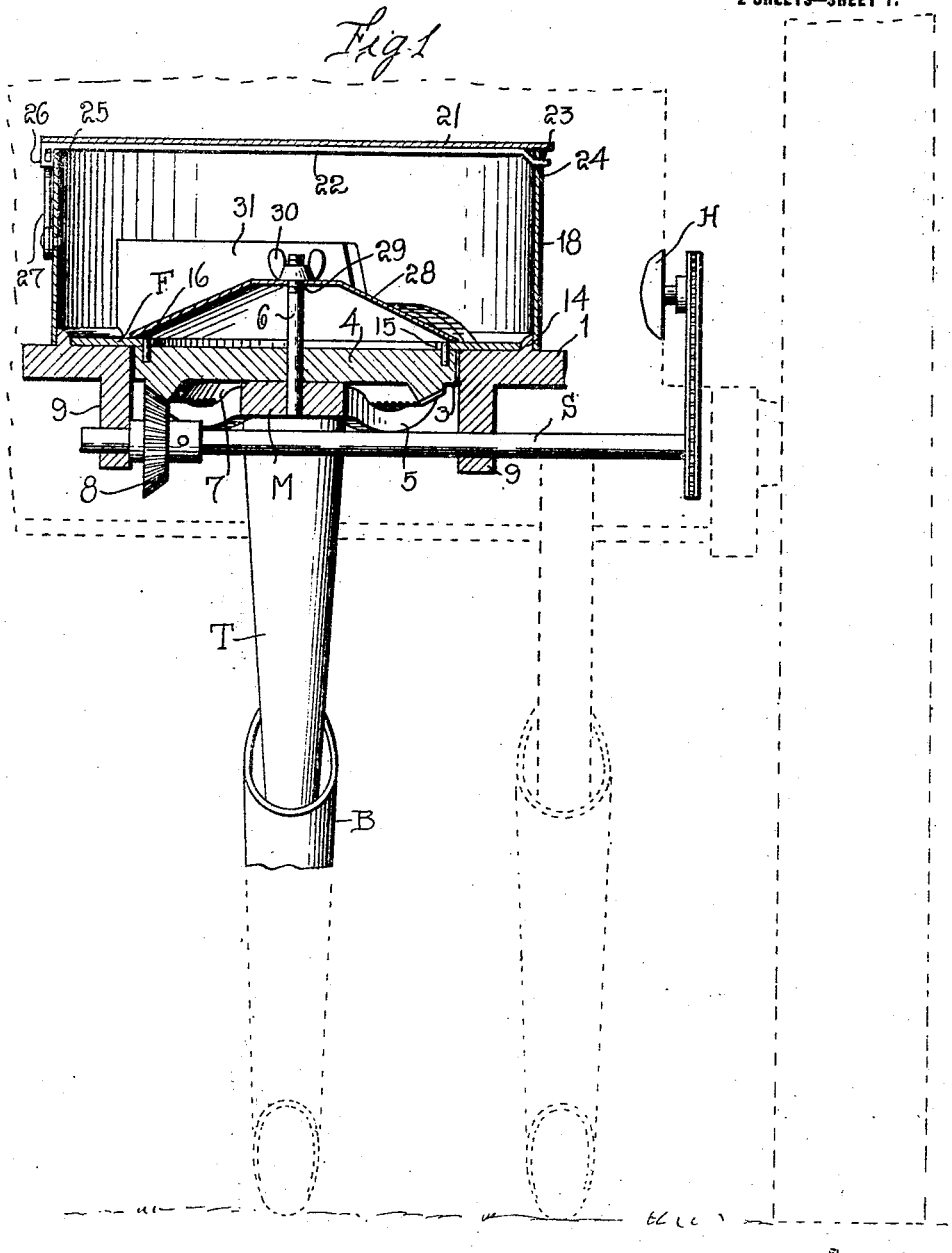
Inventor
Eddie A. Estes
By Watson E. Coleman
Attorney E. A. ESTES.
PLANTER ATTACHMENT.
APPLICATION FILED MAR. 16, 1918.
1,287,271.
Patented Dec. 10, 1918.
2 SHEETS—SHEET 2.
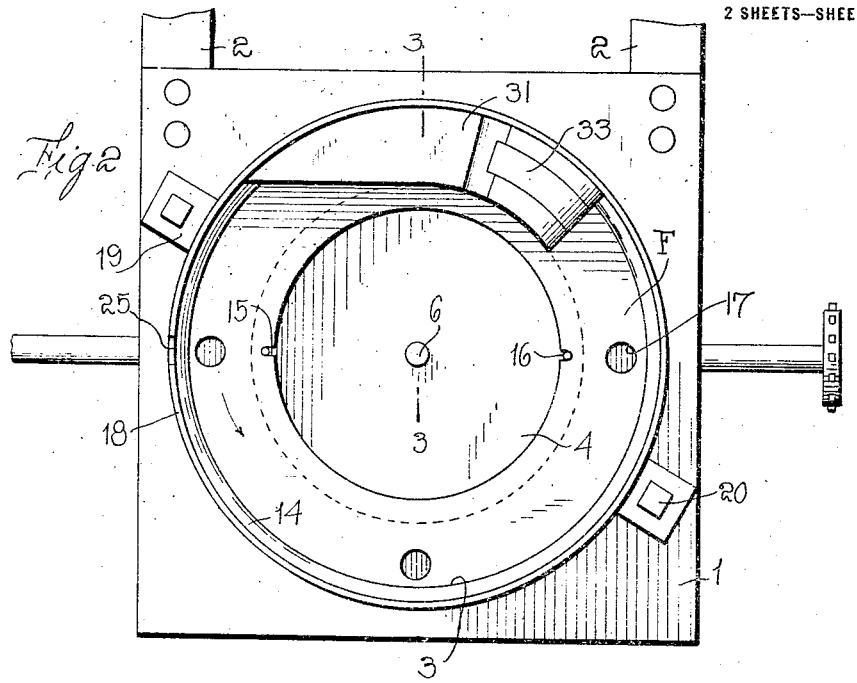
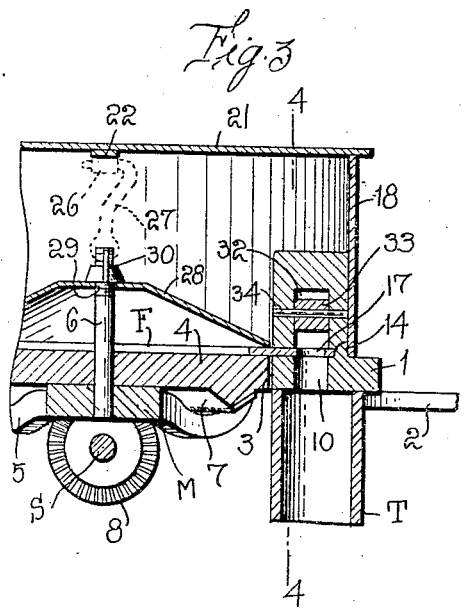
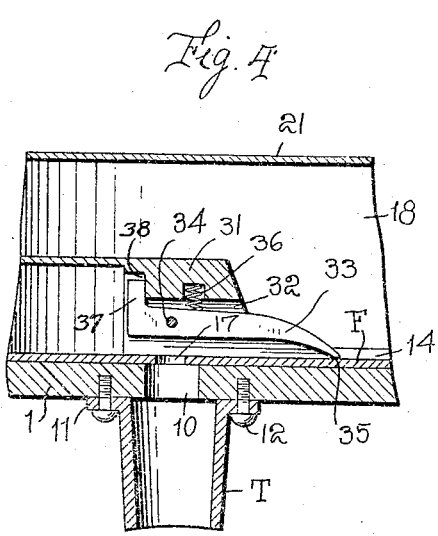
Inventor
Eddie A. Estes
By Watson E. Coleman
Attorney

UNITED STATES PATENT OFFICE.

EDDIE A. ESTES, OF LOUISA, VIRGINIA.

PLANTER ATTACHMENT.

1,287,271.     Specification of Letters Patent.     Patented Dec. 10, 1918.

Application filed March 16, 1918. Serial No. 222,953.

*To all whom it may concern:*

Be it known that I, EDDIE A. ESTES, a citizen of the United States, residing at Louisa, in the county of Louisa and State of Virginia, have invented certain new and useful Improvements in Planter Attachments, of which the following is a specification, reference being had to the accompanying drawings.

This invention relates to certain improvements in planter attachments and it is an object of the invention to provide a novel and improved attachment of this general character adapted to be supported by a wheat drill or the like and which delivers within the boot or shoe of the drill.

It is also an object of the invention to provide a novel and improved device of this general character which comprises parts which may be readily and conveniently assembled or disassembled as the occasion of practice may require and which includes a rotatable member driven from a movable part of a wheat drill or the like and which movable member serves to deliver the seed at predetermined intervals to a desired point of discharge.

Another object of the invention is to provide a novel and improved device of this general character including a rotatable element with which a removable feed member coacts together with an element for holding the feed member to the rotatable element and which last named element serves to effect the proper delivery of the seed upon the feed member.

The invention consists in the details of construction and in the combination and arrangement of the several parts of my improved planter attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in elevation and partly in section illustrating a planter attachment constructed in accordance with an embodiment of my invention, an end portion of the wheat drill or the like being indicated by dotted lines with one of the boots or shoes partly shown in elevation;

Fig. 2 is a view in top plan of my improved attachment as disclosed in Fig. 1 with the cover for the hopper removed;

Fig. 3 is a sectional view taken substantially on the line 3—3 of Fig. 1; and

Fig. 4 is a sectional view taken substantially on the line 4—4 of Fig. 3.

As disclosed in the accompanying drawings H denotes the hopper of a wheat drill or the like of any ordinary or preferred construction and which includes the boots or shoes B. In the present embodiment of my invention I disclose only a single attachment, but it is to be understood that in practice it is my purpose to employ two attachments secured to the opposite end portions of the hopper H and which are operated from the shaft S. The shaft S is adapted to be rotated in the desired direction and at the required speed with any movable part of the drill. I lay no claim to novelty relative to the means for rotating the shaft S as this mainly depends upon the character of the drill.

My improved attachment comprises a base plate 1 of predetermined dimensions and configuration and which is supported by the hopper H in any desired manner, but preferably through the medium of the straps 2. The central portion of the base plate 1 is provided with a circular opening 3 in which snugly fits the plate or disk 4. The plate or disk 4 rests upon the central portion of the spider or stellated member M. The spider or member M is positioned in a horizontal plane below the horizontal plane occupied by the base plate 1 and the arms 5 of said members are downwardly bowed as indicated in Figs. 1 and 3 and have their outer portions connected with the base plate 1. In practice it is preferred that the base plate 1 and the spider or stellated member M be formed of a single casting.

Extending upwardly from the central portion of the spider or member M and extending through the opening 3 at the axial center of said opening is the pin or shank 6. The pin or shank 6 is also directed through the plate or disk 1 at its axial center and about which said plate or disk 4 rotates. The under face of the plate or disk 4 is provided with an annular beveled gear 7 having in mesh therewith a beveled gear 8 fixed to the shaft S. The shaft S is rotatably supported by the depending brackets 9 arranged at opposite sides of the opening 3 and spaced apart in a direction longitudinally of the hopper H. The base plate 1 is so positioned as to have its inner marginal portion intersecting the vertical plane occupied by one of the boots or shoes B and said base plate 1 directly above said boot or shoe is provided with the discharge opening 10 and which is in communication with the tube T depending from the base plate 1 and discharging within the boot or shoe B. The tube T may be secured to the base plate 1 in any desired manner, but as particularly illustrated in Fig. 4, the upper end portion of said tube T is provided with the oppositely directed ears 11 through which the screws 12 are directed and which screws are engaged with the base plate 1. The upper face of the plate 1 is provided with the upstanding annular flange 14 concentric to the opening 3. Arranged inwardly of the flange 14 and having its periphery in contact therewith is an annular feed member F of a width to have its inner marginal portion overlying the peripheral portion of the plate or disk 4. The inner marginal portion of the member F at diametrically opposed points is provided with recesses or notches 15 to receive the upstanding lugs or pins 16 carried by the plate or disk 4. By this arrangement it will be perceived that when the member F is in applied position the coacting recesses or notches 15 and lugs or pins 16 will cause said member F to rotate with the plate or disk.

In predetermined spaced relation the portion of the member F resting upon the plate 1 is provided with seed receiving openings 17 which, upon rotation of the plate or disk 4 are adapted to register in succession with the opening 10 hereinbefore referred to so that the seed positioned within the openings 17 will be intermittently dropped into the boot or shoe B through the opening 10 in the plate 1 and the tube T. The distance between the openings 17 in connection with the speed of rotation of the plate or disk 4 controls the planting of the seed. It is to be noted that the member F may be removed. By this arrangement the interchangeable feed members can be employed with the openings therein differently spaced. Surrounding the flange 14 with the lower marginal portion thereof in contact with the outer face of the flange 14 is a cylindrical member 18 which, when mounted on the plate 1, affords a seed box or hopper. The member 18 at diametrically opposed points is provided with the outstanding ears 19 which are secured to the base plate 1 by the removable members 20 or any desired number. By this arrangement it will be perceived that the member 18 may be conveniently applied or removed as the occasions of practice may necessitate. Coacting with the upper end of the member 18 is the cover 21 having disposed across its under surface the radially directed member 22. One end portion of the member 22 is offset as at 23 for insertion through the slot or opening 24 produced in the upper portion of the member 18 and which has its opposite end portion seating in a notch 25 produced in the upper edge of the member 18 at a point diametrically opposed to the slot or opening 24. The member 22 exteriorly of the member 18, when the cover 21 is applied, has its end portion remote from the offset 23 provided with a depending loop 26 through which is insertible a hook member 27 pivotally engaged with the member 18. By this means it will be perceived that the cover 21 may be effectively held to the member 18 and readily removed when required.

28 denotes a substantially convexo-concave member having its axial center provided with an opening 29 through which the upper end portion of the pin or shank 6 is directed when said member 28 is in applied position. The member 28 is of a diameter to have its peripheral portion engage the inner marginal portion of the feed member F and said member 28 is clamped upon the member F through the medium of the winged nut 30 or the like in threaded engagement with the upper end portion of the pin or shank 6. The member 28 affords an effective means for maintaining the member F in applied position and also affords means to assure the proper delivery of the seed within the box or hopper as afforded by the member 18 upon the outer marginal portion of the member F.

Carried by the member 18 at the lower portion thereof and overlying the opening 10 is a member 31 and which member has its lower portion substantially in contact with the upper face of the member F and which extends substantially entirely across the space between the member 18 and the member 28 at a point in advance of the opening 10. The forward end portion of the member 31 is provided with the passageway 32 extending rearwardly of the opening 10 and arranged within the passageway 32 is a cut-off 33 supported intermediate its length as at 34 for swinging movement in a vertical plane. The forward end portion of the cut-off 33 is downwardly inclined as at 35 and said portion 35 is constantly urged toward the member F through the medium of the expansible member 36 interposed between the cut-off 33 and the upper wall of the passageway 32 at a point in advance of the pivotal mounting 34. The cut-off 33 serves to prevent the member F carrying to the opening 10 any seed other than the seed seated within the openings 17. Should the seed within the openings 17 extend above the member F such seed will readily pass by the cut-off 33 owing to its swinging or pivotal movement. It will be self-evident however, that none of the seed within the box or hopper other than the seed within the openings 17 may pass the cut-off 33. The inner end portion of the cut-off 33 is provided with an upstanding lug or finger 37 which is normally in contact with an internal shoulder 38 of the member 31 and whereby the swinging movement of the cut-off 33 under the influence of the expansible member 36 is limited so that the forward end portion of said cut-off 33 will have only light contact with the member F and the rotation of the member F will not be resisted by the cut-off 33.

My improved attachment as herein disclosed is particularly adapted for use in the planting of corn and permits a wheat drill or the like to be employed with convenience and facility for the distributing of fertilizer.

From the foregoing description, it is thought to be obvious that a planter attachment constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A planter attachment consisting of a base plate provided with a discharge orifice, a housing carried by the base plate and confining the orifice, a feed member rotatably supported by the base and positioned within the housing, said feed member being provided with openings adapted to register with the discharge orifice, means for rotating the feed member, a member carried by the housing and overlying the discharge orifice, the lower portion of said member being substantially in contact with the upper face of the feed member, said member being provided with a passageway extending rearwardly of the discharge orifice, a cut-off mounted within the passageway and supported intermediate its length for swinging movement in a vertical plane, the forward end portion of the cut-off being downwardly inclined, and an expansible member interposed between the cut-off and the upper wall of the passageway at a point in advance of the pivotal mounting of the cut-off for constantly urging the forward end portion of the cut-off toward the feed member, the inner end portion of the cut-off being provided with an outstanding lug, the member being provided with an internal shoulder with which said lug contacts, whereby the movement of the cut-off under the influence of the expansible member is limited.

In testimony whereof I hereunto affix my signature in the presence of two witnesses.

EDDIE A. ESTES.

Witnesses:
E. L. SOUTHARD,
J. M. THOMAS, Jr.